United States Patent
Luo et al.

(10) Patent No.: US 10,667,209 B2
(45) Date of Patent: May 26, 2020

(54) TERMINAL DEVICE, NETWORK DEVICE, CELL SELECTION METHOD, AND WIRELESS COMMUNICATIONS SYSTEM

(71) Applicant: HUAWEI TECHNOLOGIES CO., LTD., Shenzhen, Guangdong (CN)

(72) Inventors: Haiyan Luo, Shanghai (CN); Hongzhuo Zhang, Shanghai (CN); Tianle Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/020,921

(22) Filed: Jun. 27, 2018

(65) Prior Publication Data

US 2018/0317164 A1   Nov. 1, 2018

Related U.S. Application Data

(63) Continuation of application No. PCT/CN2015/100326, filed on Dec. 31, 2015.

(51) Int. Cl.
*H04W 48/12* (2009.01)
*H04W 48/20* (2009.01)
(Continued)

(52) U.S. Cl.
CPC .......... *H04W 48/20* (2013.01); *H04W 36/36* (2013.01); *H04W 36/38* (2013.01); *H04W 48/12* (2013.01);
(Continued)

(58) Field of Classification Search
CPC ..... H04W 48/20; H04W 92/02; H04W 48/16; H04W 48/14; H04W 48/12; H04W 36/36; H04W 48/18; H04W 36/38
See application file for complete search history.

(56) References Cited

U.S. PATENT DOCUMENTS

| | | |
|---|---|---|
| 2004/0162072 A1 | 8/2004 | Sigle et al. |
| 2012/0309385 A1* | 12/2012 | Nakamura ............ H04W 36/14 455/422.1 |
| 2015/0063295 A1 | 3/2015 | Himayat et al. |

FOREIGN PATENT DOCUMENTS

| | | |
|---|---|---|
| CN | 1522093 A | 8/2004 |
| CN | 102065495 A | 5/2011 |
| | (Continued) | |

OTHER PUBLICATIONS

R3-131340 Fujitsu,"Initial analysis on the potential impact of Small Cell UP/CP alternatives on RAN3 specs",3GPP TSG-RAN WG3 #81,Barcelona, Spain,Aug. 19-23, 2013,total 5 pages.
(Continued)

*Primary Examiner* — Lakeram Jangbahadur
(74) *Attorney, Agent, or Firm* — Womble Bond Dickinson (US) LLP

(57) ABSTRACT

This disclosure relates to a terminal device, a network device, a method of cell selection, and a wireless communications system. In the method of cell selection, a terminal device sends cell information of at least one cell in a first wireless communications system to a second network device in a second wireless communications system, so that the second network device can select a target cell in the first wireless communications system, and the terminal device accesses the target cell selected by the second network device, and accesses a core network in the first wireless communications system by using a first network device to which the target cell belongs. The terminal device provides the cell information, and the second network device selects the target cell. This implements cell selection in the future evolved first wireless communications system.

8 Claims, 7 Drawing Sheets

(51) Int. Cl.
*H04W 48/18* (2009.01)
*H04W 36/38* (2009.01)
*H04W 36/36* (2009.01)
*H04W 48/14* (2009.01)
*H04W 48/16* (2009.01)
*H04W 92/02* (2009.01)

(52) U.S. Cl.
CPC ........... *H04W 48/14* (2013.01); *H04W 48/16* (2013.01); *H04W 48/18* (2013.01); *H04W 92/02* (2013.01)

(56) References Cited

FOREIGN PATENT DOCUMENTS

| | | |
|---|---|---|
| CN | 102714845 A | 10/2012 |
| CN | 103068010 A | 4/2013 |
| EP | 2687059 B1 | 12/2014 |
| EP | 3051876 A1 | 8/2016 |
| WO | 2015039449 A1 | 3/2015 |
| WO | WO 2015039449 A1 * 3/2015 | ............ H04W 36/04 |

OTHER PUBLICATIONS

R3-131221 CATT,"Discussion on Xn interface between MeNB and SeNB",3GPP TSG RAN WG3#81,Barcelona, Spain, Aug. 19-23, 2013,total 4 pages.

R3-184042 Ericsson,"(TP for NR BL CR for TS 38.423) Xn signaling for E-UTRA—NRCell Resource Coordination",3GPP TSG-RAN WG3 Meeting AdHoc 1807,Montreal, Canada, Jul. 2-6, 2018,total 18 pages.

\* cited by examiner

TERMINAL DEVICE, NETWORK DEVICE, CELL SELECTION METHOD, AND WIRELESS COMMUNICATIONS SYSTEM

CROSS-REFERENCE TO RELATED APPLICATIONS

This application is a continuation of International Application No. PCT/CN2015/100326, filed on Dec. 31, 2015, the disclosure of which is hereby incorporated by reference in its entirety.

TECHNICAL FIELD

Embodiments of this disclosure relate to the field of wireless communications technologies, and in particular, to a terminal device, a network device, a cell selection method, and a wireless communications system.

BACKGROUND

As wireless communications technologies develop, various future evolved wireless communications systems are emerging on the basis of a current wireless communications system. A future evolved wireless communications system may implement communication in a non-standalone working manner by using another existing wireless communications system.

For example, as shown in FIG. 1, a terminal device accesses a base station in a future evolved wireless communications system. The base station is referred to as a "future evolved base station" for short. Then the terminal device accesses a core network in a long term evolution (LTE) system by using an LTE base station connected to the future evolved base station.

Therefore, in a future evolved wireless communications system, after a terminal device initiates an access request (for example, a connection setup request), a network device in an existing wireless communications system needs to be selected for the terminal device, and the terminal device accesses a core network in the existing wireless communications system by using the selected network device. Herein, the selected network device is referred to as an "anchor network device".

A current cell access procedure is no longer applicable to a wireless communications system having an anchor network device.

SUMMARY

In view of this, a terminal device, a network device, a method of cell selection, and a wireless communications system are provided, so as to provide a solution for selecting a cell in a future evolved wireless communications system.

According to a first aspect, an embodiment of this disclosure provides a method of cell selection. The method includes the following: A terminal device sends cell information of at least one cell in a first wireless communications system to a second network device in a second wireless communications system; the second network device selects a target cell in the first wireless communications system according to the received cell information of the at least one cell; and the terminal device accesses the target cell selected by the second network device, and accesses a core network in the first wireless communications system by using a first network device to which the target cell belongs.

The terminal device provides cell information of a cell in the first wireless communications system, and the second network device in the second wireless communications system selects the target cell in the first wireless communications system. This implements cell selection in the future evolved first wireless communications system.

In one embodiment, the cell information includes cell identity information.

In this way, the terminal device can indicate, to the second network device, cells in the first wireless communications system that are available for selection.

Further, in one embodiment, the cell information may further include one or more types of the following cell signal quality information:

cell-received signal strength information; or
cell-received signal quality information.

In this way, the terminal device provides the cell signal quality information, so that the second network device can select the target cell in the first wireless communications system according to cell signal quality, and the selected cell can provide relatively high quality of communication.

Based on either of the foregoing two embodiments, the terminal device may sort the obtained cell identity information of the at least one cell according to received signal strength or received signal quality of a corresponding cell, and send sorted cell identity information of the at least one cell to the second network device.

In this way, the second network device can determine a sequence of received signal strength or received signal quality of cells directly according to a sequence of the cells, so as to easily select the target cell according to cell-received signal strength or cell-received signal quality.

In one embodiment, after the second network device selects the target cell in the first wireless communications system according to the received cell information of the at least one cell, the second network device sends a channel establishment request to the first network device. The channel establishment request carries cell identity information of the target cell, to indicate the target cell that is identified by the cell identity information and that is to be accessed by the terminal device. After receiving the channel establishment request, the first network device sends a channel establishment response to the second network device. The channel establishment response is used to instruct the terminal device to access the target cell, and carries access information that is configured by the first network device for the terminal device and that is used when the terminal device accesses the target cell.

In this way, the second network device can notify the first network device of the target cell served by the first network device that is to be accessed by the terminal device. The first network device configures, for the terminal device, the access information used when the terminal device accesses the target cell.

In one embodiment, after receiving the channel establishment response sent by the first network device, the second network device sends, to the terminal device, the access information and the cell identity information of the target cell selected by the second network device, and the terminal device accesses the target cell according to the received access information and the cell identity information of the target cell.

In this way, the second network device sends, to the terminal device, the access information used when the terminal device accesses the target cell in the first wireless communications system, and the second network device notifies the terminal device of the target cell to be accessed by the terminal device. Therefore, the terminal device can access the target cell in the first wireless communications system according to the received access information, so as to implement cell access.

In one embodiment, the access information sent by the second network device to the terminal device may be in a header of a layer 1 or layer 2 data packet sent by the second network device. In another embodiment, the access information is included in an air interface establishment message that is sent by the first network device to the terminal device and that is forwarded by the second network device. The air interface establishment message is used to establish an air interface connection between the terminal device and the target cell.

Herein, two embodiments of sending the access information to the terminal device are provided.

In one embodiment, the first wireless communications system is an LTE system, and the second wireless communications system is a $5^{th}$ generation 5G system.

According to a second aspect, an embodiment of this disclosure provides a terminal device. The terminal device has functions of implementing operations of the terminal device in the foregoing method. The functions may be implemented by using hardware, or may be implemented by executing corresponding software by hardware. The hardware or software includes one or more modules corresponding to the foregoing functions.

In one embodiment, a structure of the terminal device includes a processor and a transmitter. The processor is configured to support the terminal device in implementing corresponding functions in the foregoing method. The transmitter is configured to support the terminal device in sending, to a first network device or a second network device, a message or data in the foregoing method. In one embodiment, the terminal device may further include a receiver, configured to receive, from the first network device or the second network device, a message or data in the foregoing method. The terminal device may further include a memory. The memory is configured to be coupled with the processor and stores a program instruction and data necessary for the terminal device.

According to a third aspect, an embodiment of this disclosure provides a network device. The network device has functions of implementing operations of the second network device in the foregoing method. The functions may be implemented by using hardware, or may be implemented by executing corresponding software by hardware. The hardware or software includes one or more modules corresponding to the foregoing functions.

In one embodiment, a structure of the network device includes a processor and a first receiver. The processor is configured to support the network device in implementing corresponding functions in the foregoing method. The first receiver is configured to support the network device in receiving, from a terminal device, a message or data in the foregoing method. In addition, the network device may further include a second receiver, a first transmitter, and a second transmitter. The first transmitter is configured to support the network device in sending, to the terminal device, a message or data in the foregoing method. The second receiver is configured to support the network device in receiving, from a first network device, a message or data in the foregoing method. The second transmitter is configured to support the network device in sending, to the first network device, a message or data in the foregoing method.

The network device may further include a memory. The memory is configured to be coupled with the processor and stores a program instruction and data necessary for the network device.

According to a fourth aspect, an embodiment of this disclosure provides a network device. The network device has functions of implementing operations of the first network device in the foregoing method. The functions may be implemented by using hardware, or may be implemented by executing corresponding software by hardware. The hardware or software includes one or more modules corresponding to the foregoing functions.

In one embodiment, a structure of the network device includes a processor, a transmitter, and a receiver. The processor is configured to support the network device in implementing corresponding functions in the foregoing method. The receiver is configured to support the network device in receiving, from a second network device, a message or data in the foregoing method. The transmitter is configured to support the network device in sending, to the second network device, a message or data in the foregoing method.

The network device may further include a memory. The memory is configured to be coupled with the processor and stores a program instruction and data necessary for the network device.

According to a fifth aspect, an embodiment of this disclosure provides a wireless communications system. The wireless communications system includes the terminal device, the first network device, and the second network device according to any one of the first to the fourth aspects.

According to a sixth aspect, an embodiment of this disclosure provides a computer storage medium configured to store a computer software instruction used by the terminal device described in any one of the first to the fifth aspects. The computer software instruction includes a program designed for executing the foregoing aspects.

According to a seventh aspect, an embodiment of this disclosure provides a computer storage medium, configured to store a computer software instruction used by the second network device described in any one of the first to the fifth aspects. The computer software instruction includes a program designed for executing the foregoing aspects.

According to an eighth aspect, an embodiment of this disclosure provides a computer storage medium configured to store a computer software instruction used by the first network device described in any one of the first to the fifth aspects. The computer software instruction includes a program designed for executing the foregoing aspects.

According to a ninth aspect, an embodiment of this disclosure provides a method of cell selection. The method includes the following: A terminal device selects a target cell in a first wireless communications system, and sends cell identity information of the selected target cell to a second network device in a second wireless communications system; the second network device determines the target cell according to the received cell identity information of the target cell; and the terminal device accesses the target cell, where the terminal device accesses a core network in the first wireless communications system by using a first network device to which the target cell belongs.

The terminal device selects the target cell in the first wireless communications system, and notifies the first network device in the first wireless communications system of the target cell by using the second network device in the second wireless communications system.

In one embodiment, the terminal device selects the target cell according to one or more types of the following information of a cell in the first wireless communications system:
received signal strength information;
received signal quality information;
cell load information;
interference information;
data transmission delay information; or
backhaul link capacity information.

Herein, an embodiment of selecting the target cell by the terminal device is provided.

In one embodiment, after receiving the cell identity information of the target cell sent by the terminal device, the second network device sends a channel establishment request to the first network device. The channel establishment request carries the cell identity information of the target cell to indicate the target cell that is identified by the cell identity information and that is to be accessed by the terminal device. After receiving the channel establishment request, the first network device sends, to the second network device, a channel establishment response that carries access information that is configured by the first network device for the terminal device and that is used when the terminal device accesses the target cell. After receiving the channel establishment response, the second network device may send, to the terminal device, the access information carried in the channel establishment response. After receiving the access information, the terminal device may access the target cell according to the access information.

In this way, the second network device can notify the first network device of the target cell served by the first network device that is to be accessed by the terminal device. The first network device configures, for the terminal device, the access information used when the terminal device accesses the target cell. The second network device sends the access information to the terminal device. In this way, the terminal device can access the target cell in the first wireless communications system according to the received access information, so as to implement cell access.

In one embodiment, the access information is in a header of a layer 1 or layer 2 data packet sent by the second network device. Alternatively, the access information is included in an air interface establishment message that is sent by the first network device to the terminal device and that is forwarded by the second network device. The air interface establishment message is used to establish an air interface connection between the terminal device and the target cell.

Herein, two embodiments of sending the access information to the terminal device are provided.

In one embodiment, the first wireless communications system is an LTE system, and the second wireless communications system is a 5G system.

According to a tenth aspect, an embodiment of this disclosure provides a terminal device. The terminal device has functions of implementing operations of the terminal device in the method provided in the ninth aspect. The functions may be implemented by using hardware, or may be implemented by executing corresponding software by hardware. The hardware or software includes one or more modules corresponding to the foregoing functions.

In one embodiment, a structure of the terminal device includes a processor and a transceiver. The processor is configured to support the terminal device in implementing corresponding functions in the foregoing method. The transceiver is configured to support the terminal device in communicating with a second network device and a first network device, and in sending, to the first network device or the second network device, a message or data in the method provided in the ninth aspect, or in receiving, from the first network device or the second network device, a message or data in the method provided in the ninth aspect. The terminal device may further include a memory. The memory is configured to be coupled with the processor and stores a program instruction and data necessary for the terminal device.

According to an eleventh aspect, an embodiment of this disclosure provides a network device. The network device has functions of implementing operations of the second network device in the method provided in the ninth aspect. The functions may be implemented by using hardware, or may be implemented by executing corresponding software by hardware. The hardware or software includes one or more modules corresponding to the foregoing functions.

In one embodiment, a structure of the network device includes a processor and a first receiver. The processor is configured to support the network device in implementing corresponding functions in the method provided in the ninth aspect. The first receiver is configured to support the network device in receiving, from a terminal device, a message or data in the method provided in the ninth aspect. In addition, the network device may further include a second receiver, a first transmitter, and a second transmitter. The first transmitter is configured to support the network device in sending, to the terminal device, a message or data in the method provided in the ninth aspect. The second receiver is configured to support the network device in receiving, from a first network device, a message or data in the method provided in the ninth aspect. The second transmitter is configured to support the network device in sending, to the first network device, a message or data in the method provided in the ninth aspect.

The network device may further include a memory. The memory is configured to be coupled with the processor and stores a program instruction and data necessary for the network device.

According to a twelfth aspect, an embodiment of this disclosure provides a network device. The network device has functions of implementing operations of the first network device in the method provided in the ninth aspect. The functions may be implemented by using hardware, or may be implemented by executing corresponding software by hardware. The hardware or software includes one or more modules corresponding to the foregoing functions.

In one embodiment, a structure of the network device includes a processor, a transmitter, and a receiver. The processor is configured to support the network device in implementing corresponding functions in the method provided in the ninth aspect. The receiver is configured to support the network device in receiving, from a second network device, a message or data in the method provided in the ninth aspect. The transmitter is configured to support the network device in sending, to the second network device, a message or data in the method provided in the ninth aspect.

According to a thirteenth aspect, an embodiment of this disclosure provides a wireless communications system. The wireless communications system includes the terminal device, the first network device, and the second network device according to any one of the ninth to the twelfth aspects.

According to a fourteenth aspect, an embodiment of this disclosure provides a computer storage medium configured to store a computer software instruction used by the terminal device described in any one of the ninth to the twelfth aspects. The computer software instruction includes a program designed for executing the foregoing aspects.

According to a fifteenth aspect, an embodiment of this disclosure provides a computer storage medium, configured to store a computer software instruction used by the second network device described in any one of the ninth to the twelfth aspects. The computer software instruction includes a program designed for executing the foregoing aspects.

According to a sixteenth aspect, an embodiment of this disclosure provides a computer storage medium configured to store a computer software instruction used by the first network device described in any one of the ninth to the twelfth aspects. The computer software instruction includes a program designed for executing the foregoing aspects.

According to a seventeenth aspect, an embodiment of this disclosure provides a method of cell selection. The method includes the following: A terminal device sends cell information of at least one cell in a first wireless communications system to a second network device in a second wireless communications system; the second network device sends a channel establishment request to a first network device to which each of the at least one cell belongs, where a channel establishment request sent to one first network device includes cell information of a cell served by the first network device, in the at least one cell; the first network device selects a target cell from the at least one cell according to the cell information of the at least one cell included in the received channel establishment request; and the terminal device accesses the target cell selected by the first network device, and accesses a core network in the first wireless communications system by using the first network device.

The terminal device provides cell information of a cell in the first wireless communications system, the second network device in the second wireless communications system forwards the cell information, and the first network device in the first wireless communications system selects the target cell in the first wireless communications system. This implements cell selection in the future evolved first wireless communications system.

In one embodiment, the cell information includes cell identity information.

In this way, the terminal device can indicate, to the first network device, cells in the first wireless communications system that are available for selection.

Further, in one embodiment, the cell information may further include one or more types of the following cell signal quality information:

cell-received signal strength information; or cell-received signal quality information.

In this way, the terminal device provides the cell signal quality information, so that the first network device can select the target cell in the first wireless communications system according to cell signal quality, and the selected cell can provide relatively high quality of communication.

Based on either of the foregoing two embodiments, the terminal device may sort the obtained cell identity information of the at least one cell according to received signal strength or received signal quality of a corresponding cell, and send sorted cell identity information of the at least one cell to the first network device.

In this way, the first network device can determine a sequence of received signal strength or received signal quality of cells directly according to a sequence of the cells, so as to easily select the target cell according to cell-received signal strength or cell-received signal quality.

In one embodiment, after the second network device sends the channel establishment request to the first network device to which each of the at least one cell in the first wireless communications system belongs, the second network device receives a channel establishment response sent by at least one first network device, where the channel establishment response includes the following information:

access information that is configured by the first network device for the terminal device and that is used when the terminal device accesses a cell of the first network device; and cell identity information of the cell selected by the first network device for the terminal device; and the second network device selects a target first network device from the at least one first network device sending the channel establishment response, and uses a cell indicated by the target first network device, as the target cell, and the second network device sends the following information to the terminal device:

access information configured by the target first network device for the terminal device; and cell identity information of the target cell selected by the target first network device for the terminal device.

The terminal device accesses the target cell according to the cell identity information of the target cell and the access information that is configured by the target first network device for the terminal device.

In this way, the target first network device can configure the access information for the terminal device, and indicate, to the terminal device, the target cell to be accessed by the terminal device.

In one embodiment, when the second network device sends the access information and the cell identity information of the target cell to the terminal device, the access information and/or the cell identity information of the target cell are/is in a header of a layer 1 or layer 2 data packet sent by the second network device. In another embodiment, the access information and/or the cell identity information of the target cell are/is included in an air interface establishment message that is sent by the target first network device to the terminal device and that is forwarded by the second network device. The air interface establishment message is used to establish an air interface connection between the terminal device and the target cell.

Herein, two embodiments of sending the access information and the cell identity information of the target cell to the terminal device are provided.

In one embodiment, the first wireless communications system is an LTE system, and the second wireless communications system is a 5G system.

According to an eighteenth aspect, an embodiment of this disclosure provides a terminal device. The terminal device has functions of implementing operations of the terminal device in the method provided in the seventeenth aspect. The functions may be implemented by using hardware, or may be implemented by executing corresponding software by hardware. The hardware or software includes one or more modules corresponding to the foregoing functions.

In one embodiment, a structure of the terminal device includes a processor and a transceiver. The processor is configured to support the terminal device in implementing corresponding functions in the method provided in the seventeenth aspect. The transceiver is configured to support the terminal device in communicating with a second network device and a first network device, and in sending, to the first network device or the second network device, a message or data in the method provided in the seventeenth aspect, or in receiving, from the first network device or the second network device, a message or data in the method provided in the seventeenth aspect. The terminal device may further include a memory. The memory is configured to be coupled with the processor and stores a program instruction and data necessary for the terminal device.

According to a nineteenth aspect, an embodiment of this disclosure provides a network device. The network device has functions of implementing operations of the second network device in the method provided in the seventeenth aspect. The functions may be implemented by using hardware, or may be implemented by executing corresponding software by hardware. The hardware or software includes one or more modules corresponding to the foregoing functions.

In one embodiment, a structure of the network device includes a first receiver and a second transmitter. In one embodiment, the structure of the network device may further include a processor. The processor is configured to support the network device in implementing corresponding functions in the method provided in the seventeenth aspect. The first receiver is configured to support the network device in receiving, from a terminal device, a message or data in the method provided in the seventeenth aspect. The second transmitter is configured to support the network device in sending, to a first network device, a message or data in the method provided in the seventeenth aspect. In addition, the network device may further include a first transmitter and a second receiver. The first transmitter may be configured to support the network device in sending, to the terminal device, a message or data in the method provided in the seventeenth aspect. The second receiver may be configured to support the network device in receiving, from the first network device, a message or data in the method provided in the seventeenth aspect.

The network device may further include a memory. The memory is configured to be coupled with the processor and stores a program instruction and data necessary for the network device.

According to a twentieth aspect, an embodiment of this disclosure provides a network device. The network device has functions of implementing operations of the first network device in the method provided in the seventeenth aspect. The functions may be implemented by using hardware, or may be implemented by executing corresponding software by hardware. The hardware or software includes one or more modules corresponding to the foregoing functions.

In one embodiment, a structure of the network device includes a processor and a second receiver. The processor is configured to support the network device in implementing corresponding functions in the method provided in the seventeenth aspect. The second receiver is configured to support the network device in receiving, from a second network device, a message or data in the method provided in the seventeenth aspect. In addition, the network device may further include a first transmitter, a first receiver, and a second transmitter. The first transmitter is configured to support the network device in sending, to the terminal device, a message or data in the method provided in the seventeenth aspect. The first receiver is configured to support the network device in receiving, from the terminal device, a message or data in the method provided in the seventeenth aspect. The second transmitter is configured to support the network device in sending, to the second network device, a message or data in the method provided in the seventeenth aspect.

The network device may further include a memory. The memory is configured to be coupled with the processor and stores a program instruction and data necessary for the network device.

According to a twenty-first aspect, an embodiment of this disclosure provides a wireless communications system. The wireless communications system includes the terminal device, the first network device, and the second network device according to any one of the seventeenth to the twentieth aspects.

According to a twenty-second aspect, an embodiment of this disclosure provides a computer storage medium configured to store a computer software instruction used by the terminal device according to any one of the seventeenth to the twenty-first aspects. The computer software instruction includes a program designed for executing the foregoing aspects.

According to a twenty-third aspect, an embodiment of this disclosure provides a computer storage medium configured to store a computer software instruction used by the second network device according to any one of the seventeenth to the twenty-first aspects. The computer software instruction includes a program designed for executing the foregoing aspects.

According to a twenty-fourth aspect, an embodiment of this disclosure provides a computer storage medium configured to store a computer software instruction used by the first network device described in any one of the seventeenth to the twenty-first aspects. The computer software instruction includes a program designed for executing the foregoing aspects.

DESCRIPTION OF EMBODIMENTS

To make the objectives, solutions, and advantages of this disclosure more understandable, the following provides detailed descriptions. The detailed descriptions provide various implementations of an apparatus and/or a method by using block diagrams, flowcharts, other accompany drawings, and/or examples. These block diagrams, flowcharts, and/or examples include one or more functions and/or operations. Persons skilled in the art may understand that each function and/or operation in the block diagrams, the flowcharts, and/or the examples can be performed independently and/or jointly by using various types of hardware, software, and firmware, and/or any combination thereof.

The terms "system" and "network" may be used interchangeably in this disclosure. The term "and/or" in this disclosure describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

For ease of understanding, Table 1 lists embodiments of this disclosure and related accompany drawings in the following.

TABLE 1

Figure 1:
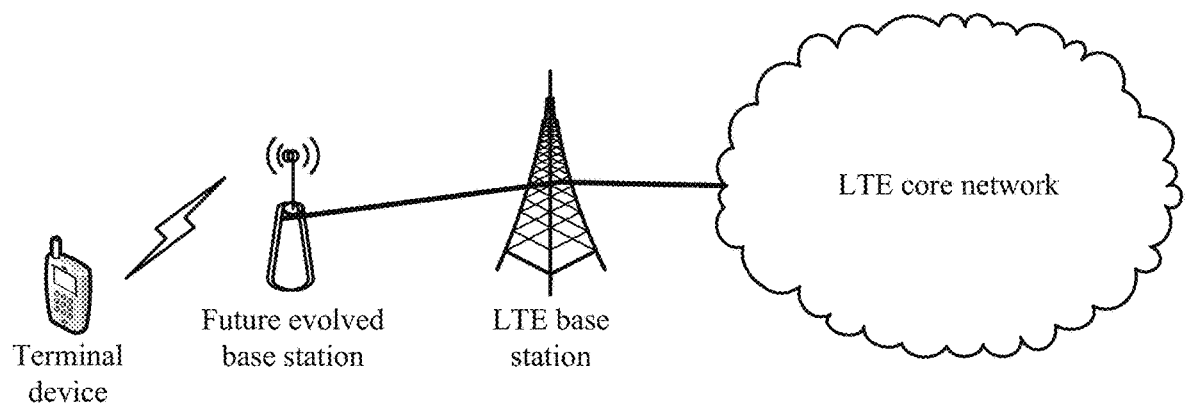
FIG. 1 is a schematic diagram showing that a future evolved base station runs in a non-standalone working manner.
Figure 2:
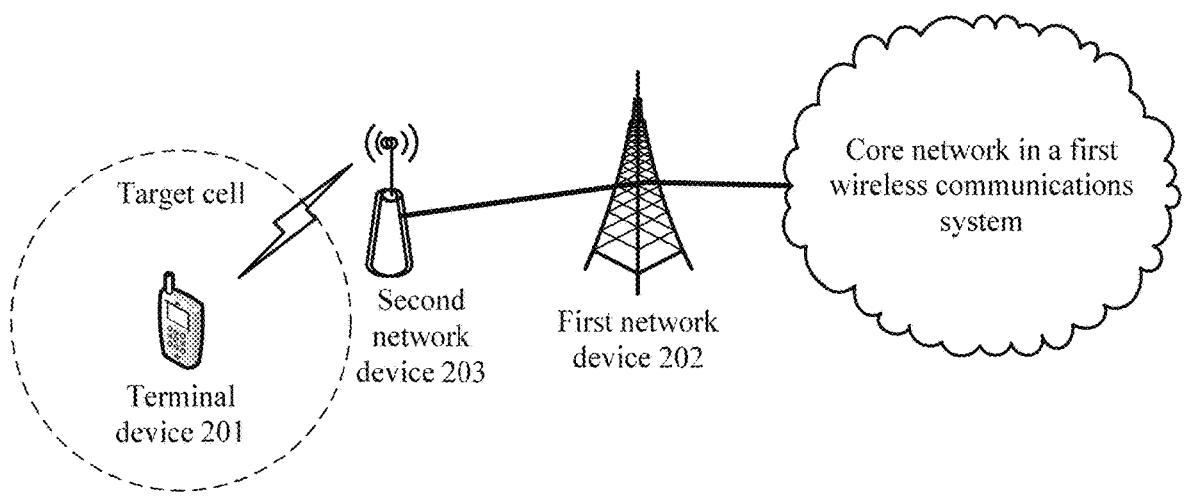
FIG. 2 is a schematic structural diagram of a wireless communications system according to one embodiment.
Figure 3:
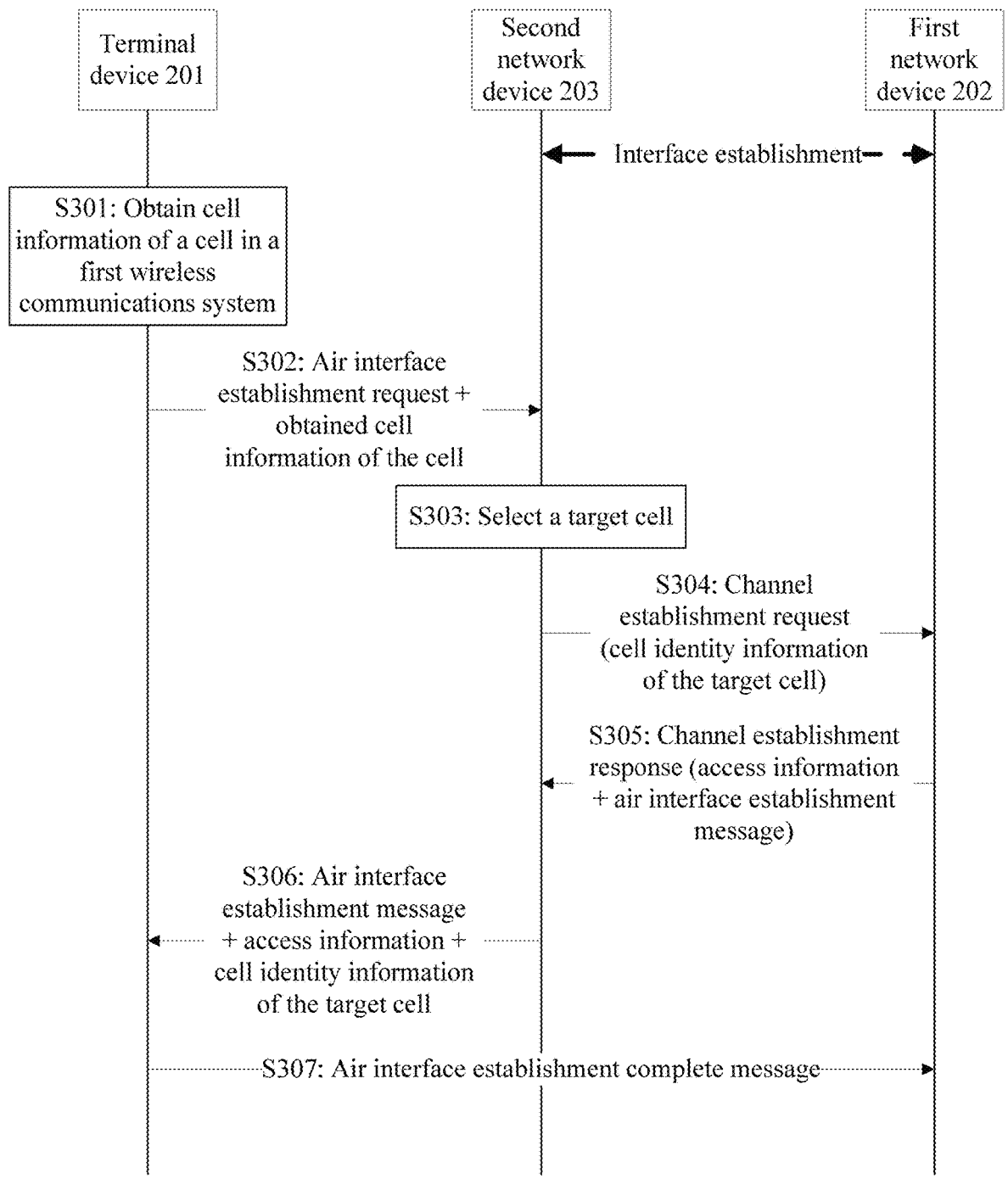
FIG. 3 is a flowchart of a method of cell selection according to one embodiment.
Figure 4:
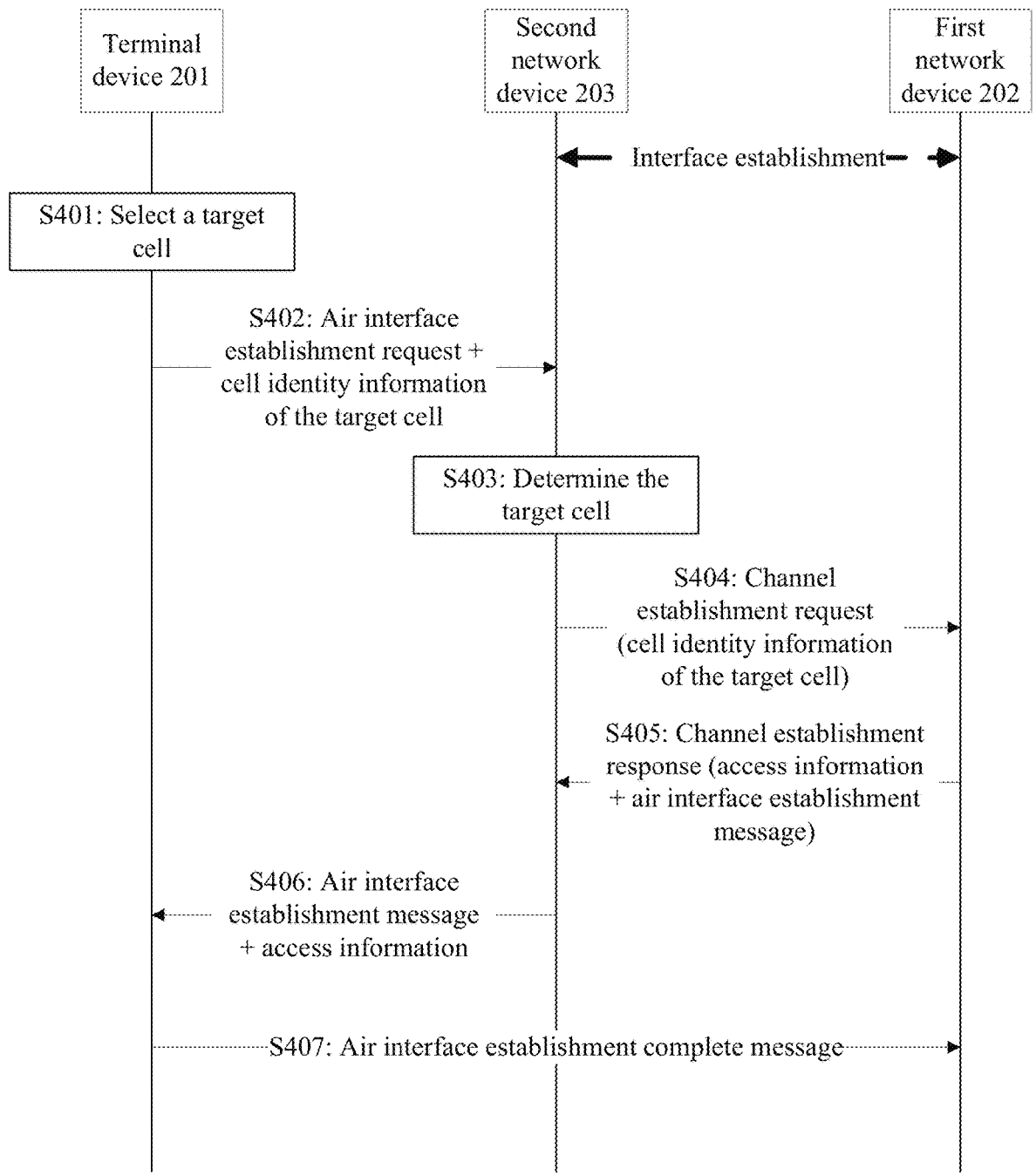
FIG. 4 is a flowchart of another method of cell selection according to one embodiment.
Figure 5:
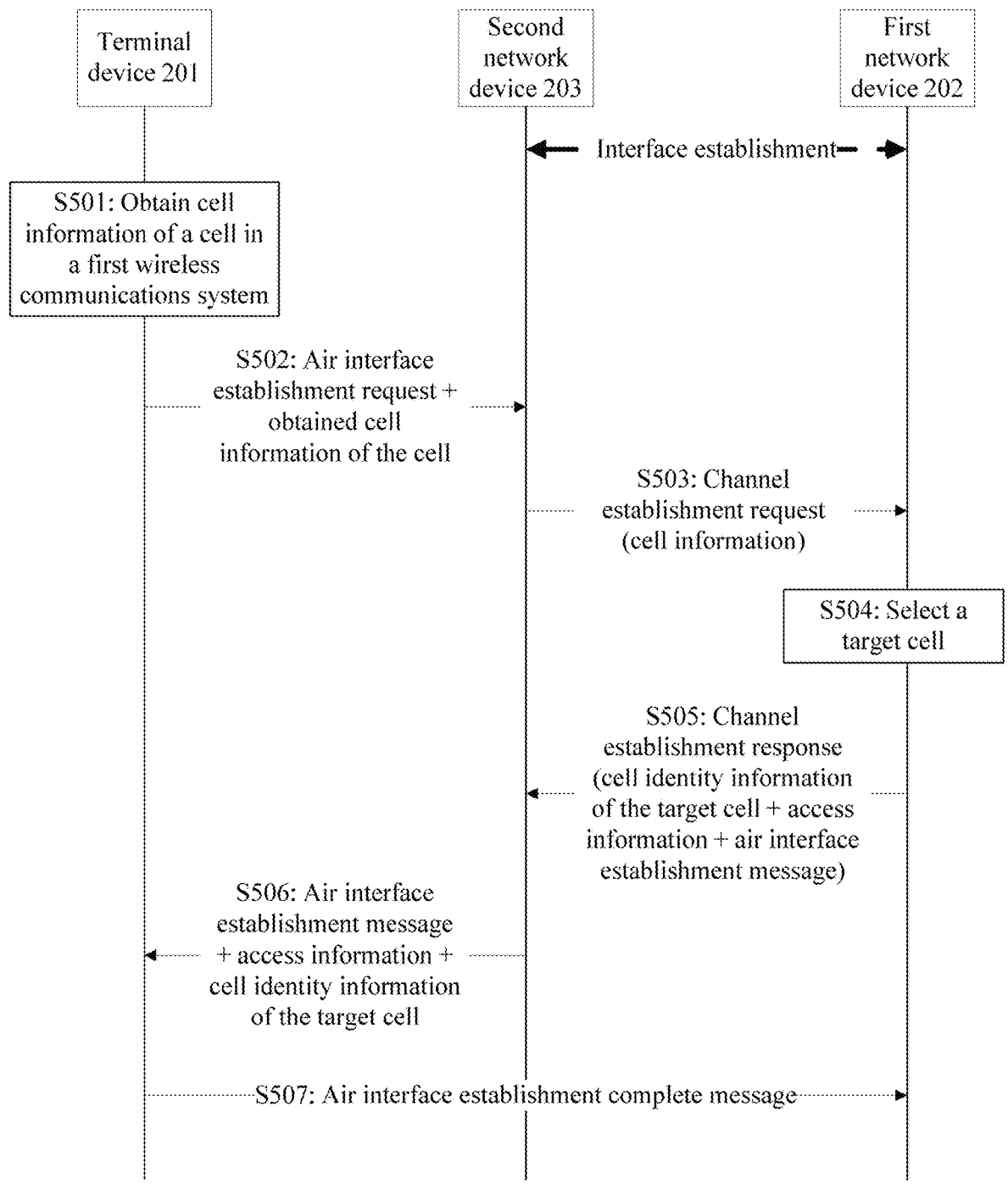
FIG. 5 is a flowchart of yet another method of cell selection according to one embodiment.
Figure 6:
FIG. 6 is a schematic structural diagram of a first type of terminal device according to one embodiment.
Figure 7:
FIG. 7 is a schematic structural diagram of a first type of terminal device according to one embodiment.
Figure 8:
FIG. 8 is a schematic structural diagram of a second type of terminal device according to one embodiment.
Figure 9:
FIG. 9 is a schematic structural diagram of another second type of terminal device according to one embodiment.
Figure 10:
FIG. 10 is a schematic structural diagram of a third type of terminal device according to one embodiment.
Figure 11:
FIG. 11 is a schematic structural diagram of another third type of terminal device according to one embodiment.
Figure 12:
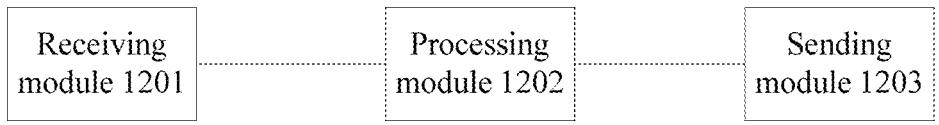
FIG. 12 is a schematic structural diagram of a first type of a first network device according to one embodiment.
Figure 13:
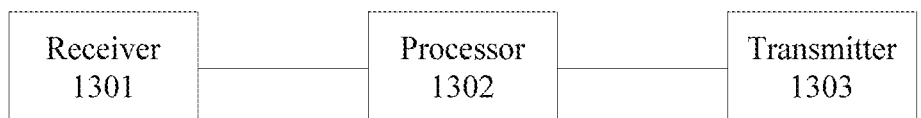
FIG. 13 is a schematic structural diagram of another first type of the first network device according to one embodiment.
Figure 14:
FIG. 14 is a schematic structural diagram of a second type of the first network device according to one embodiment.
Figure 15:
FIG. 15 is a schematic structural diagram of another second type of the first network device according to one embodiment.
Figure 16:
FIG. 16 is a schematic structural diagram of a first type of a second network device according to one embodiment.
Figure 17:
FIG. 17 is a schematic structural diagram of another first type of the second network device according to one embodiment.
Figure 18:
FIG. 18 is a schematic structural diagram of a second type of the second network device according to one embodiment.
Figure 19:
FIG. 19 is a schematic structural diagram of another second type of the second network device according to one embodiment.

| Embodiment | Main content | Accompanying drawing |
| --- | --- | --- |
| Embodiment 1 | Future evolved wireless communications system | FIG. 2 |
| Embodiment 2 | A network device of an existing standard selects a cell | FIG. 3 |
| Embodiment 3 | A terminal device selects a cell. | FIG. 4 |
| Embodiment 4 | A future evolved network device selects a cell. | FIG. 5 |
| Embodiment 5 | First type of terminal device | FIG. 6 and FIG. 7 |
| Embodiment 6 | Second type of terminal device | FIG. 8 and FIG. 9 |
| Embodiment 7 | Third type of terminal device | FIG. 10 and FIG. 11 |
| Embodiment 8 | First type of first network device | FIG. 12 and FIG. 13 |
| Embodiment 9 | Second type of first network device | FIG. 14 and FIG. 15 |
| Embodiment 10 | First type of second network device | FIG. 16 and FIG. 17 |
| Embodiment 11 | Second type of second network device | FIG. 18 and FIG. 19 |

TABLE 1-continued

Figure 20:
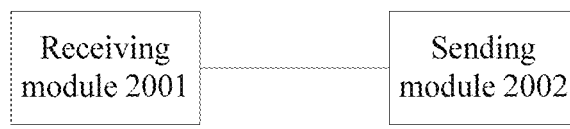
FIG. 20 is a schematic structural diagram of a third type of the second network device according to one embodiment.
Figure 21:
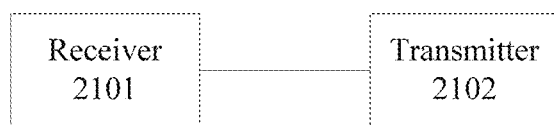
FIG. 21 is a schematic structural diagram of another third type of the second network device according to one embodiment.

| Embodiment | Main content | Accompanying drawing |
| --- | --- | --- |
| Embodiment 12 | Third type of second network device | FIG. 20 and FIG. 21 |

Embodiment 1

FIG. 2 is a schematic structural diagram of a wireless communications system according to one embodiment. As shown in FIG. 2, the wireless communications system includes a terminal device 201, a first network device 202 in a first wireless communications system, and a second network device 203 in a second wireless communications system.

An air interface connection has been established between the terminal device 201 and the second network device 203. The first network device 202 is connected to the second network device 203. The terminal device 201 accesses a core network in the first wireless communications system by using the first network device 202, and accesses a target cell of the first network device 202.

The first wireless communications system may be a future evolved wireless communications system, and the second wireless communications system may be an existing wireless communications system. In one embodiment, the first wireless communications system and the second wireless communications system each may be an existing wireless communications system. In one embodiment, the first wireless communications system is an existing wireless communications system, and the second wireless communications system is a future evolved wireless communications system.

In any one of the foregoing cases, a solution provided in the following Embodiment 2, Embodiment 3, or Embodiment 4 may be used to select a target cell in the first wireless communications system that is to be accessed by the terminal device 201.

Communications standards of the existing wireless communications system include but are not limited to: global system for mobile communications (GSM), code division multiple access (CDMA) IS-95, CDMA 2000, time division-synchronous code division multiple access (TD-SCDMA), wideband code division multiple access (WCDMA), time division duplex-long term evolution (TDD LTE), frequency division duplex-long term evolution (FDD LTE), long term evolution-advanced (LTE-advanced), personal handy-phone system (PHS), wireless fidelity (WiFi) stipulated in the 802.11 series of protocols, and worldwide interoperability for microwave access (WiMAX).

The terminal device 201 may be a wireless terminal. The wireless terminal may be a device providing voice and/or data connectivity to a user, a handheld device having a wireless connection function, or another processing device connected to a wireless modem. The wireless terminal may communicate with at least one core network by using a radio access network (RAN). The wireless terminal may be a mobile terminal, such as a mobile phone (also referred to as a "cellular" phone) or a computer having a mobile terminal. For example, the mobile terminal may be a portable mobile apparatus, a pocket-sized mobile apparatus, a handheld mobile apparatus, a computer built-in mobile apparatus, or an in-vehicle mobile apparatus. They exchange voice and/or data with the radio access network. For example, the wireless terminal is a personal communications service (PCS) phone, a cordless phone, a session initiation protocol (SIP)

phone, a wireless local loop (WLL) station, a personal digital assistant (PDA), or another device. The wireless terminal may alternatively be referred to as a subscriber unit, a subscriber station, a mobile station, a mobile station, a remote station, an access point, a remote terminal, an access terminal, a user terminal, a user agent, a user device, or user equipment.

The first network device 202 or the second network device 203 may be a base station or a radio resource management device for controlling a base station, or may include a base station and a radio resource management device for controlling a base station. The base station may be a macro base station or a small cell, for example, a small cell or a microcell. The base station may alternatively be a home base station, for example, a home nodeB (HNB) or a home evolved nodeB (HeNB). The base station may alternatively include a relay node or the like.

For example, for LTE systems such as a TDD LTE system, a FDD LTE system, and an LTE-A system, a network device in an existing wireless communications system may be an evolved nodeB (eNodeB), and the terminal device 201 may be user equipment (UE). For a TD-SCDMA system or a WCDMA system, a network device in an existing wireless communications system may include a nodeB and/or a radio network controller (RNC), and the terminal device 201 may be UE. For a GSM system, a network device in an existing wireless communications system may include a base transceiver station (BTS) and/or a base station controller (BSC), and the terminal device 201 is a mobile station (MS). For a WiFi system, a network device in an existing wireless communications system may include an access point (AP) and/or an access controller (AC), and the terminal device 201 may be a station (STA).

The following describes embodiments for selecting, in the wireless communications system provided in Embodiment 1, a target cell in the first wireless communications system for the terminal device 201.

Any one of the embodiments can be used to implement target cell selection. A difference of the embodiments lies in: In Embodiment 2, 3 or 4, the second network device 203 in the second wireless communications system selects a target cell; in Embodiment 2, the terminal device 201 selects a target cell; in Embodiment 3, the first network device 202 in the first wireless communications system selects a target cell.

Embodiment 2

In Embodiment 2, an interface connection is first established between a first network device 202 and a second network device 203.

For example, the first network device 202 is a 5G base station, and the second network device 203 is an LTE base station. An interface is pre-established between the 5G base station and the LTE base station, and may be referred to as an "X5 interface".

For example, the 5G base station learns of a transport network layer (TNL) addressing address of the LTE base station by using an operation, administration, and maintenance (OAM) configuration, and then initiates a request for establishing an X5 interface. Alternatively, the LTE base station learns of a TNL addressing address of the 5G base station according to an OAM configuration, and then initiates a request for establishing an X5 interface. The 5G base station and the LTE base station may exchange cell load, a data transmission delay, a backhaul link capacity, or other information with each other by using the X5 interface.

FIG. 3 is a flowchart of a method of cell selection according to one embodiment. As shown in FIG. 3, the procedure includes the following steps.

At S301, terminal device 201 obtains cell information of a cell in a first wireless communications system.

For example, the terminal device 201 may obtain cell information of a cell in the first wireless communications system by means of cell search. The obtained cell information may include cell identity information. The cell identity information may be a physical cell identity (PCI), and in this case, one PCI is used to uniquely identify one cell. Alternatively, the cell identity information may include a PCI and cell frequency information. In this case, one PCI corresponds to a plurality of cells, where the plurality of cells have different frequencies, and a frequency-PCI combination may be used to uniquely identify a cell.

The cell information may include only the foregoing cell identity information, or may include one or more of the following information in addition to the foregoing cell identity information:

cell-received signal strength information, for example, reference signal received power (RSRP); or cell-received signal quality information, for example, reference signal received quality (RSRQ).

At S302, the terminal device 201 sends the obtained cell information of the cell to a second network device 203.

The terminal device 201 may send, to the second network device 203, the obtained cell information of the cell in the first wireless communications system in a process of accessing the second network device 203.

In one embodiment, the terminal device 201 may choose to access the second network device 203 when one or more of the following cases occur.

Case 1: The first network device 202 or another network device in the first wireless communications system instructs, in a broadcast mode, the terminal device 201 to choose to camp in another wireless communications system. For example, one-bit indication information may be used to instruct the terminal device 201 to perform access by using an air interface of a second wireless communications system, or to indicate, to the terminal device 201, cell identity information, for example, a PCI or a PCI-frequency combination, of a cell in a second wireless communications system, where the cell can be accessed by the terminal device 201.

Case 2: The first network device 202 and the second network device 203 broadcast their respective information, such as cell load information, data transmission delay information, and backhaul link capacity information, and the like. The terminal device 201 chooses, according to one or more of the received information, to access the second network device 203. For example, when the first network device 202 has relatively high cell load, and the second network device 203 has relatively low cell load, the terminal device 201 may choose to access the second network device 203. For another example, when the first network device 202 has a relatively long cell data transmission delay, whereas the second network device 203 has a relatively short cell data transmission delay, the terminal device 201 may choose to access the second network device 203.

Case 3: After the terminal device 201 makes an attempt to access a cell in the first wireless communications system but fails in accessing the cell, the terminal device 201 accesses the second network device 203.

For example, the second network device 203 is a 5G base station, and the first network device 202 is an LTE base station. A possible design of a 5G system air interface, referred to as a 5G air interface for short, is as follows: The 5G air interface includes only a radio link control (RLC) layer, a media access control (MAC) layer, and a physical (PHY) layer, or the 5G air interface includes only a MAC layer and a PHY layer, or the 5G air interface includes only a PHY layer.

Therefore, in step S302, the terminal device 201 can indicate, only at a 5G air interface protocol layer, cell information of a cell of the first network device 202 (e.g. an LTE base station).

For example, when the 5G air interface includes a MAC layer, the cell information of the cell of the LTE base station may be sent at the MAC layer of the 5G air interface. Assuming that the terminal device 201 accesses a 5G base station in a random access procedure, the terminal device 201 may provide the cell information of the cell of the LTE base station in a message 3 (or msg 3) used in the random access procedure. Herein, a message used in a random access procedure of an LTE system is used. In a 5G system, a message used in a random access procedure may have another name, or a random access procedure is different from a random access procedure in a current LTE system, provided that the cell information of the cell in the first wireless communications system can be successfully sent in a process of accessing the second network device 203 by the terminal device 201, and the second network device 203 can determine a cell in the first wireless communications system according to the received cell information, and determine a first network device 202 to which the cell belongs.

An embodiment of sending the obtained cell information of the cell by the terminal device 201 is as follows.

If the terminal device 201 sends cell information of a plurality of cells in the first wireless communications system, the terminal device 201 may sort obtained cell identity information of the plurality of cells according to received signal strength or received signal quality of a corresponding cell. The terminal device 201 sends sorted cell identity information to the second network device 203.

Another embodiment is as follows: The terminal device 201 sends obtained cell identity information of each cell, and obtained received signal strength information and/or received signal quality information of each cell.

In one embodiment, the terminal device 201 may or may not send the obtained cell information of the cell together with an air interface establishment request. The air interface establishment request is to be sent by the terminal device 201 to the first network device 202 by using the second network device 203, to request to access the first network device 202.

Assuming that the second network device 203 is a 5G base station, and the first network device 202 is an LTE base station, the air interface establishment request may be a radio resource control (RRC) connection request message.

At S303, the second network device 203 selects a target cell.

After receiving the cell information, of the cell in the first wireless communications system, that is sent by the terminal device 201, the second network device 203 may select, according to the cell information received in step S302 and one or more types of the following information of the cell corresponding to the cell information, the target cell to be accessed by the terminal device 201:
cell load information;
cell interference information;
cell data transmission delay information; or
cell backhaul link capacity information.

For example, the second network device 203 may select a cell that is less interfered and that has relatively low load, as the target cell. For another example, the second network device 203 may select a cell in which the terminal device 201 has highest received signal strength, as the target cell, or the like, so as to ensure quality of communication performed by the terminal device 201 after the terminal device 201 accesses the target cell.

At S304, the second network device 203 sends a channel establishment request to a first network device 202, where the channel establishment request carries cell identity information of the target cell selected by the second network device 203, to indicate, to the first network device 202, the target cell that is identified by the cell identity information and that is to be accessed by the terminal device 201.

The channel establishment request may be a request for establishing a dedicated channel for the terminal device 201. The channel establishment request may further carry the air interface establishment request, for example, an RRC connection request message, that is sent by the terminal device 201 in step S302.

After selecting the target cell for the terminal device 201 in step S303, the second network device 203 finds the first network device 202 to which the target cell belongs, and sends the channel establishment request to the first network device 202 that is found.

The channel establishment request is a dedicated message for the terminal device 201. Therefore, the message may carry identity information that is allocated by the second network device 203 to the terminal device 201 and that is used to identify the terminal device 201 on an interface between the second network device 203 and the first network device 202, for example, the foregoing X5 interface. When the second network device 203 is a network device in a 5G system, the identity information may be referred to as a "5G X5 UEAP ID".

The second network device 203 sends, to the first network device 202, the cell identity information of the target cell selected for the terminal device 201, so that the first network device 202 prepares a corresponding air interface resource for the terminal device 201 in the target cell, for subsequent transmission.

At S305, after receiving the channel establishment request sent by the second network device 203, the first network device 202 sends a channel establishment response to the second network device 203 to instruct the terminal device 201 to access the target cell.

The channel establishment response may carry access information that is configured by the first network device 202 for the terminal device 201 and that is used when the terminal device 201 accesses the target cell.

The access information may include air interface identity information allocated by the first network device 202 to the terminal device 201. For example, when the first network device 202 is an LTE base station, the access information may include an air-interface cell radio network temporary identifier (C-RNTI) that is allocated by the LTE base station to the terminal device 201, and preamble related information, for example, preamble identifier information and mask identifier information of a random access channel, that is used in a random access procedure in which the terminal device 201 accesses the first network device 202. The mask identifier information is used to indicate, to the terminal device 201, specific random access channels that are in a system frame and on which the terminal device 201 may send a preamble. For example, for a "PRACH mask index" stipulated in Table 7.3-1 in the $3^{rd}$ generation partnership project (3GPP) technical specification (TS) 36.321, a value 0 indicates that a preamble may be sent on all available physical random access channel (PRACH) resources. In a non-contention-based random access procedure, the LTE base station may directly specify, by using the mask, a particular PRACH on which the terminal device 201 sends a preamble, so as to avoid a conflict between the terminal device 201 and another terminal device. After receiving the access information, the terminal device 201 may perform random access in the first wireless communications system in a non-contention manner according to the access information.

Assuming that the first network device 202 uses a parameter used in a random access procedure in an LTE system, the preamble identifier may be a ra-PreambleIndex defined in the $3^{rd}$ generation partner project (3GPP) technical specification (TS) 36.331, and the mask identifier information of the random access channel may be a ra-PRACH-MaskIndex defined in the specification.

In one embodiment, the channel establishment response may carry an air interface establishment message, for example, an RRC connection setup message, that is sent by the first network device 202 to the terminal device 201. The message is used to establish an air interface between the terminal device 201 and the target cell.

The access information carried in the channel establishment response may be included in the air interface establishment message, or may not be included in the air interface establishment message. If the access information is included in the air interface establishment message, after receiving the channel establishment response sent by the first network device 202, the second network device 203 obtains the air interface establishment message from the received channel establishment response, and forwards the air interface establishment message to the terminal device 201, so that the access information can be sent to the terminal device 201. If the access information is not included in the air interface establishment message, the second network device 203 needs to additionally send the access information to the terminal device 201. Certainly, the second network device 203 may send the access information to the terminal device 201 together with the air interface establishment message.

The channel establishment response may be a reply message of the request for establishing the dedicated channel for the terminal device 201. The channel establishment response is a dedicated message for the terminal device 201. Therefore, the message may carry identity information, for example, identity information identifying the terminal device 201 on the foregoing X5 interface that is allocated by the first network device 202 to the terminal device 201 and that is used to identify the terminal device 201 on an interface between the first network device 202 and the second network device 203. When the second network device 203 is a network device in a 5G system, and the first network device 202 is a network device in an LTE system, the identity information may be referred to as an "LTE X5UEAP ID".

At S306, the second network device 203 sends, to the terminal device 201, access information allocated by the first network device 202 and the cell identity information of the target cell selected by the second network device 203 for the terminal device 201.

If the access information sent by the first network device 202 in step S305 is included in the air interface establishment message, in step S306, the second network device 203 directly forwards, to the terminal device 201, the air interface establishment message obtained from the channel establishment response, so that the access information can be sent to the terminal device 201.

If the access information sent by the first network device 202 in step S305 is not included in the air interface establishment message, in step S306, the second network device 203 needs to additionally send the access information to the terminal device 201. For example, when the access information is sent to the terminal device 201, the access information may be added to a header of a layer 1 or layer 2 data packet sent by the second network device 203. For example, when an air interface between the terminal device 201 and the second network device 203 includes only an RLC layer, a MAC layer, and a PHY layer, the access information may be located in an RLC header, a MAC header, or a PHY header. For another example, when an air interface between the terminal device 201 and the second network device 203 includes only a MAC layer and a PHY layer, the access information may be located in a MAC header or a PHY header. When an air interface between the terminal device 201 and the second network device 203 includes only a PHY layer, the access information may be located in a PHY header.

If the second network device 203 is a 5G base station, a 5G air interface includes only a MAC layer and a PHY layer, and the second network device 203 is an LTE base station, a format of a message sent by the second network device 203 to the terminal device 201 may be as follows:

| 5G PHY | 5G MAC | LTE RLC | LTE PDCP | LTE RRC |
|---|---|---|---|---|

In other words, an LTE RRC message sequentially undergoes LTE PDCP layer encapsulation, LTE RLC layer encapsulation, 5G MAC layer encapsulation, and 5G PHY layer encapsulation. The LTE RRC, PDCP, and RLC layers are invisible to a 5G base station. After receiving the message, the terminal device 201 parses the message in the following order: a PHY, MAC, RLC, PDCP, and RRC layer.

In addition, the cell identity information of the target cell may also be included in the air interface establishment message, or added to the header of the layer 1 or layer 2 data packet sent by the second network device 203.

At S307, after receiving the access information and the cell identity information of the target cell that are sent by the second network device 203, the terminal device 201 accesses the target cell according to the received access information and cell identity information of the target cell, and after successfully accessing the target cell, sends an air interface establishment complete message to the first network device 202 by using the second network device 203, or directly sends an air interface establishment complete message to the first network device 202 through an air interface connection that has been established between the terminal device 201 and the first network device 202, instead of forwarding the air interface establishment complete message by the second network device 203.

Embodiment 3

Embodiment 3 is different from Embodiment 2 in the following way:

In Embodiment 2, the terminal device 201 sends cell information of at least one cell to the second network device 203, and the second network device 203 selects, from the at least one cell, a target cell to be accessed by the terminal device 201. The target cell belongs to the first network device 202.

In Embodiment 3, a terminal device 201 selects a target cell, and the target cell belongs to a second network device 203.

In Embodiment 3, an interface connection may be first established between a first network device 202 and the second network device 203. For a method of establishing the interface connection, refer to Embodiment 2. Details are not repeated herein any further for brevity sake.

FIG. 4 is a flowchart of a cell selection solution according to Embodiment 3. As shown in FIG. 4, the procedure includes the following steps.

At S401, a terminal device 201 selects a target cell in a first wireless communications system.

The terminal device 201 may also obtain cell information of a cell in the first wireless communications system by using a cell search method, and then select the target cell from at least one cell according to obtained cell information of the at least one cell.

For a method of obtaining the cell information by the terminal device 201, refer to descriptions in step S301 in Embodiment 2. For various optional implementations of the cell information, also refer to various optional implementations provided in step S301.

The terminal device 201 may select the target cell according to one or more types of the following information of the cell in the first wireless communications system:

received signal strength information, for example, RSRP;
received signal quality information, for example, RSRQ;
cell load information;
cell interference information;
cell data transmission delay information; or
cell backhaul link capacity information.

The terminal device 201 may obtain received signal strength information and received signal quality information of a cell in a cell search process or a wireless measurement process.

The terminal device 201 may obtain, from a second network device 203, the following information of the cell in the first wireless communications system: cell load information, interference information, data transmission delay information, and backhaul link capability information. The information is sent by a first network device 202 to the second network device 203 by using an interface between the first network device 202 and the second network device 203, for example, the foregoing X5 interface, and then, the second network device 203 sends the information to the terminal device 201.

Alternatively, the terminal device 201 may obtain, from a message that is broadcast by at least one first network device 202, the following information of a cell of one first network device 202: cell load information, interference information, data transmission delay information, and backhaul link capability information.

The terminal device 201 may select the target cell in many manners. For example, the terminal device 201 may select a cell that is less interfered and that has relatively low load, as the target cell. For another example, the terminal device 201 may select a cell in which the terminal device 201 has highest received signal strength, as the target cell; or the like, so as to ensure quality of communication performed by the terminal device 201 after the terminal device 201 accesses the target cell.

At S402, the terminal device 201 sends cell identity information of the selected target cell to a second network device 203.

For various implementations of the cell identity information, refer to descriptions in step S301.

The terminal device 201 may add the cell identity information of the target cell to an air interface establishment request, for example, an RRC connection request message.

Alternatively, the terminal device 201 indicates the cell identity information of the target cell at an air interface protocol layer of an air interface between the terminal device 201 and the second network device 203.

For an implementation of the air interface between the terminal device 201 and the second network device 203, refer to related descriptions in step S302.

For example, the air interface between the terminal device 201 and the second network device 203 is a 5G air interface, and the first network device 202 is an LTE base station. For example, when the 5G air interface includes a MAC layer, the cell identity information of the target cell may be sent at the MAC layer of the 5G air interface. Assuming that the terminal device 201 accesses a 5G base station in a random access procedure, the terminal device 201 may provide the cell identity information of the target cell in a msg 3 used in the random access procedure. Herein, a message used in a random access procedure of an LTE system is used. In a 5G system, a message used in a random access procedure may have another name, or a random access procedure is different from a random access procedure in a current LTE system, provided that the cell identity information of the target cell can be successfully sent in a process of accessing the second network device 203 by the terminal device 201.

In one embodiment, the second network device 203 may notify in advance the terminal device 201 whether the cell identity information is included in the air interface establishment request or the cell identity information of the target cell is indicated at the air interface protocol layer of the air interface between the terminal device 201 and the second network device 203 when the cell identity information of the target cell is sent. The terminal device 201 selects, according to the notification of the second network device 203, a manner of sending the cell identity information of the target cell.

At S403, the second network device 203 determines the target cell according to the received cell identity information of the target cell.

If the terminal device 201 indicates the cell identity information of the target cell at the air interface protocol layer of the air interface between the terminal device 201 and the second network device 203, the second network device 203 may directly obtain a cell identity of the target cell, then determine the target cell, and may further determine a first network device 202 to which the target cell belongs.

If the terminal device 201 adds the cell identity information of the target cell to the air interface establishment request, for example, an RRC connection request message, an optional implementation solution is as follows: The second network device 203 may subsequently send the air interface establishment request to at least one first network device 202, and after obtaining the cell identity information in the air interface establishment request, a first network device 202 that has received the air interface establishment request may determine whether a corresponding target cell belongs to an area managed by the first network device 202. If the corresponding target cell belongs to the area, the first network device 202 responds to a channel establishment request, and sends a channel establishment response to the second network device 203. After receiving the channel establishment response, the second network device 203 may learn of the first network device 202 to which the target cell belongs.

At S404, the second network device 203 sends a channel establishment request to a first network device 202 (when the second network device 203 is unable to learn the cell identity information of the target cell, the second network device 203 may send a channel establishment request to a plurality of first network devices 202), where the channel establishment request carries the cell identity information of the target cell selected by the terminal device 201, to indicate, to the first network device 202, the target cell that is identified by the cell identity information and that is to be accessed by the terminal device 201.

The channel establishment request may be a request for establishing a dedicated channel for the terminal device 201. The channel establishment request may further carry the air interface establishment request, for example, an RRC connection request message, that is sent by the terminal device 201 in step S402.

The channel establishment request is a dedicated message for the terminal device 201. Therefore, the message may carry identity information that is allocated by the second network device 203 to the terminal device 201 and that is used to identify the terminal device 201 on an interface between the second network device 203 and the first network device 202, for example, the foregoing X5 interface. When the second network device 203 is a network device in a 5G system, the identity information may be referred to as a "5G X5 UEAP ID".

The second network device 203 sends, to the first network device 202, the cell identity information of the target cell selected by the terminal device 201, so that the first network device 202 prepares a corresponding air interface resource for the terminal device 201 in the target cell, for subsequent transmission.

At S405, after receiving the channel establishment request, a first network device 202 to which the target cell belongs sends a channel establishment response to the second network device 203, to instruct the terminal device 201 to access the target cell.

The channel establishment response message may not include the cell identity information of the target cell, because the target cell is selected by the terminal device 201 and the terminal device 201 knows which cell is the target cell.

The channel establishment response may carry access information that is configured by the first network device 202 for the terminal device 201 and that is used when the terminal device 201 accesses the target cell. For content included in the access information, an embodiment of sending the access information, an embodiment of processing the access information by the second network device 203, and the like, refer to the description of step S305.

The channel establishment response may also carry an air interface establishment message sent by the first network device 202 to the terminal device 201. For specific implementation, refer to step S305.

At S406, the second network device 203 sends, to the terminal device 201, access information allocated by the first network device 202.

For an embodiment of sending the access information to the terminal device 201 by the second network device 203, refer to step S306.

At S407, after receiving the access information sent by the second network device 203, the terminal device 201 accesses the target cell according to the received access information, and after successfully accessing the target cell, sends an air interface establishment complete message to the first network device 202 by using the second network device 203, or directly sends an air interface establishment complete message to the first network device 202 through an air interface connection that has been established between the terminal device 201 and the first network device 202, instead of forwarding the air interface establishment complete message by the second network device 203.

Embodiment 4

Embodiment 4 is different from Embodiment 3 and Embodiment 2 in the following way:

In Embodiment 2, the terminal device 201 sends cell information of at least one cell to the second network device 203, and the second network device 203 selects, from the at least one cell, a target cell to be accessed by the terminal device 201. The target cell belongs to the first network device 202.

In Embodiment 3, the terminal device 201 selects a target cell, and the target cell belongs to the second network device 203.

In Embodiment 4, a terminal device 201 sends cell information of at least one cell to a second network device 203, then, the second network device 203 sends the received cell information to at least one first network device 202, and the at least one first network device 202 selects a target cell.

In Embodiment 4, an interface connection may be first established between the first network device 202 and the second network device 203. For a method of establishing the interface connection, refer to Embodiment 2. Details are not repeated herein any further for brevity sake.

FIG. 5 is a flowchart of a cell selection solution according to Embodiment 4. As shown in FIG. 5, the procedure includes the following steps.

At S501, a terminal device 201 obtains cell information of at least one cell in a first wireless communications system.

For a method of obtaining the cell information by the terminal device 201, refer to step S301.

At S502, the terminal device 201 sends the obtained cell information of the at least one cell to a second network device 203.

The terminal device 201 may add the cell information to an air interface establishment request, for example, an RRC connection request message.

Alternatively, the terminal device 201 adds the cell information to an air interface protocol layer message transmitted by using an air interface between the terminal device 201 and the second network device 203.

For an embodiment of the air interface between the terminal device 201 and the second network device 203, refer to related descriptions in step S302.

For example, the air interface between the terminal device 201 and the second network device 203 is a 5G air interface, and the first network device 202 is an LTE base station. For example, when the 5G air interface includes a MAC layer, the cell information may be sent at the MAC layer of the 5G air interface. Assuming that the terminal device 201 accesses a 5G base station in a random access procedure, the terminal device 201 may provide the cell information in a msg 3 used in the random access procedure. Herein, a message in a random access procedure of an LTE system is used. In a 5G system, a message used in a random access procedure may have another name, or a random access procedure is different from a random access procedure in a current LTE system, provided that the cell information can be successfully sent in a process of accessing the second network device 203 by the terminal device 201.

In one embodiment, the second network device 203 may notify in advance the terminal device 201 whether the cell information is included in the air interface establishment request or the cell information is indicated at an air interface protocol layer of the air interface between the terminal device 201 and the second network device 203 when the cell information is sent. The terminal device 201 selects, according to the notification of the second network device 203, a manner of sending the cell information.

At S503, after receiving the cell information sent by the terminal device 201, the second network device 203 sends a channel establishment request to a first network device 202.

If the terminal device 201 indicates the cell information at the air interface protocol layer of the air interface between the terminal device 201 and the second network device 203, the second network device 203 may directly determine a cell corresponding to the cell information, and may further determine a first network device 202 to which the cell belongs. If the received cell information is corresponding to a plurality of cells, for each of the plurality of cells, when sending the channel establishment request to the first network device 202, the second network device 203 may send a channel establishment request to a first network device 202 to which the cell belongs. The channel establishment request carries cell information of the cell. If a part of the plurality of cells belongs to a same first network device 202, the second network device 203 may send one channel establishment request to the same first network device 202 to which the part of cells belongs. The channel establishment request carries cell information of each of the part of cells.

If the terminal device 201 adds the cell information to the air interface establishment request, for example, an RRC connection request message, an optional implementation solution is as follows: The second network device 203 may subsequently send the air interface establishment request to at least one first network device 202, and after obtaining the cell information in the air interface establishment request, a first network device 202 that has received the air interface establishment request may determine whether a corresponding cell belongs to an area managed by the first network device 202. If the corresponding cell belongs to the area, and the first network device 202 allows the terminal device 201 to access the cell managed by the first network device 202, the first network device 202 responds to a channel establishment request, and sends a channel establishment response to the second network device 203.

At S504, after receiving the channel establishment request, the first network device 202 obtains the cell information from the channel establishment request, and selects a target cell according to the obtained cell information, or selects a target cell according to the obtained cell information and one or more of the following information:

cell load information;
cell interference information;
cell data transmission delay information; or
cell backhaul link capacity information.

At S505, the first network device 202 sends a channel establishment response to the second network device 203, where the channel establishment response carries access information configured by the first network device 202 for the terminal device 201 and cell identity information of the target cell selected by the first network device 202 for the terminal device 201.

For content included in the access information, an embodiment of sending the access information, an embodiment of processing the access information by the second network device 203, and the like, refer to the description of step S305.

The channel establishment response may also carry an air interface establishment message sent by the first network device 202 to the terminal device 201. For specific implementation, refer to step S305.

For example, the second network device 203 is a 5G base station, and the first network device 202 is an LTE base station. Four possible cases are listed as follows:

Case 1:

Both cell identity information of a target cell and access information are included in an air interface establishment message. In this case, the second network device 203 does not know cell identity information of a target cell selected by the first network device 202, nor know access information allocated by the first network device 202 to the terminal device 201. Assuming that the second network device 203 receives a channel establishment response sent by only one first network device 202, the second network device 203 extracts an air interface establishment request from the channel establishment response, and then directly forwards the air interface establishment request to the terminal device 201. If the second network device 203 receives channel establishment responses sent by a plurality of first network devices 202, the second network device 203 selects one of the channel establishment responses, and extracts a corresponding air interface establishment request message. The terminal device 201 obtains, by reading the air interface establishment message, the cell identity information of the target cell and the access information configured by the first network device 202 for the terminal device 201, and accesses the target cell according to the obtained access information and the cell identity information.

Case 2:

Cell identity information of a target cell is included in an air interface establishment message, access information configured by the first network device 202 for the terminal device 201 is sent by using an interface message transmitted by using an interface between the first network device 202 and the second network device 203. In this case, the second network device 203 does not know cell identity information of a target cell selected by the first network device 202, but knows the access information configured by the first network device 202 for the terminal device 201. Assuming that the second network device 203 receives a channel establishment response sent by only one first network device 202, the second network device 203 extracts an air interface establishment request from the channel establishment response, and then directly forwards the air interface establishment request to the terminal device 201. If the second network device 203 receives channel establishment responses sent by a plurality of first network devices 202, the second network device 203 selects one of the channel establishment responses, and extracts a corresponding air interface establishment request message. The second network device 203 indicates the received access information to the terminal device 201 by using an air interface protocol layer of an interface between the second network device 203 and the terminal device 201. The terminal device 201 obtains, by reading the air interface establishment message, the cell identity information of the target cell, and obtains, from an air interface protocol layer message transmitted by using the air interface between the terminal device 201 and the second network device 203, the access information configured by the first network device 202 for the terminal device 201, and accesses the target cell according to the obtained access information and the cell identity information.

Case 3:

Cell identity information of a target cell is sent by using an interface message transmitted by using an interface between the first network device 202 and the second network device 203, and access information configured by the first network device 202 for the terminal device 201 is included in an air interface establishment message. In this case, the second network device 203 knows cell identity information of a target cell selected by the first network device 202 for the terminal device 201. If the second network device 203 receives channel establishment responses sent by a plurality of first network devices 202, the second network device 203 selects one of the channel establishment responses, and extracts a corresponding air interface establishment request message and the cell identity information. When forwarding the air interface establishment message to the terminal device 201, the second network device 203 may add the cell identity information of the target cell to an air interface protocol layer message transmitted by using an air interface between the second network device 203 and the terminal device 201. The terminal device 201 obtains the cell identity information of the target cell from the air interface protocol layer message transmitted by using the air interface between the terminal device 201 and the second network device 203, and obtains, by reading the air interface establishment message, the access information configured by the first network device 202 for the terminal device 201, and accesses the target cell according to the obtained access information and cell identity information.

Case 4:

Both cell identity information of a target cell and access information configured by the first network device 202 for the terminal device 201 are sent by using an interface message transmitted by using an interface between the first network device 202 and the second network device 203. In this case, the second network device 203 knows cell identity information of a target cell selected by the first network device 202, and also knows the access information configured by the first network device 202 for the terminal device 201. If the second network device 203 receives channel establishment responses sent by a plurality of first network devices 202, the second network device 203 selects an air interface establishment request message and cell identity information that are sent by one of the first network devices 202. When forwarding the air interface establishment message, the second network device 203 may add, to an air interface protocol layer message transmitted by using an air interface between the second network device 203 and the terminal device 201, the cell identity information of the target cell and the access information configured by the first network device 202 for the terminal device 201. The terminal device 201 obtains, by reading the air interface protocol layer message transmitted by using the air interface between the terminal device 201 and the second network device 203, the cell identity information of the target cell and the access information configured by the first network device 202 for the terminal device 201, and accesses the target cell according to the obtained cell identity information and access information.

At S506, the second network device 203 sends, to the terminal device 201, the cell identity information of the target cell and the access information configured by the first network device 202 for the terminal device 201.

After the second network device 203 receives the channel establishment response sent by the first network device 202 (a plurality of first network devices 202 may send channel establishment responses to the second network device 203), the second network device 203 may select a target first network device 202 from the first network device 202 that sends the channel establishment response, and use a cell indicated in a channel establishment response sent by the target first network device 202, as a target cell to be accessed by the terminal device 201.

Interfaces may exist between the second network device 203 and a plurality of first network devices 202. Therefore, the plurality of first network devices 202 may return channel establishment responses to the second network device 203. In this case, the second network device 203 may select the target first network device 202 from the plurality of first network devices 202 according to the following cell related information stored by the second network device 203:

cell load information;
cell interference information;
cell data transmission delay information; or
cell backhaul link capacity information.

At S507, after receiving the access information and the cell identity information of the target cell that are sent by the second network device 203, the terminal device 201 accesses the target cell according to the received access information and cell identity information of the target cell, and after successfully accessing the target cell, sends an air interface establishment complete message to the first network device 202 by using the second network device 203, or directly sends an air interface establishment complete message to the first network device 202 through an air interface connection that has been established between the terminal device 201 and the first network device 202, instead of forwarding the air interface establishment complete message by the second network device 203.

Embodiment 5

FIG. 6 is a schematic structural diagram of a first type of terminal device according to one embodiment. As shown in FIG. 6, the terminal device includes:

a processing module 601 configured to obtain cell information of at least one cell in a first wireless communications system; and a sending module 602 configured to send, to a second network device in a second wireless communications system, the cell information of the at least one cell obtained by the processing module 601, where the cell information of the at least one cell is used to instruct the second network device to select a target cell in the first wireless communications system according to the received cell information of the at least one cell, where the terminal device accesses the target cell, and accesses a core network in the first wireless communications system by using a first network device to which the target cell belongs.

The terminal device may further include a receiving module, configured to receive a message and/or data that are/is sent by the first network device or the second network device.

For another embodiment of the terminal device, refer to implementation of the terminal device 201 in Embodiment 2. The processing module 601 may be configured to perform processing and control operations of the terminal device 201. The sending module 602 may be configured to perform a sending operation of the terminal device 201. The receiving module may be configured to perform a receiving operation of the terminal device 201.

For a procedure in which the terminal device interacts with the first network device and the second network device, refer to the procedure in which the terminal device 201 interacts with the first network device 202 and the second network device 203 in the procedure shown in FIG. 3. For content and a structure of a message sent or received by the terminal device, also refer to the description of the procedure.

An embodiment of the terminal device may be shown in FIG. 7. A processor 701 may be configured to implement a function of the processing module 601. A transmitter 702 may be configured to implement a function of the sending module 602. In one embodiment, a receiver may further be included, and may be configured to implement a function of the receiving module in the terminal device. In addition, the terminal device may further include a memory, configured to store a program and data. The processor 701 may perform processing and control by invoking the program stored in the memory.

The transmitter 702, the memory, and the receiver each may be directly connected to the processor 701. Alternatively, the transmitter 702, the memory, the receiver, and the processor 701 each are connected to a bus, and the components communicate with each other by using the bus.

Embodiment 6

FIG. 8 is a schematic structural diagram of a second type of terminal device according to one embodiment. As shown in FIG. 8, the terminal device includes:

a processing module 801 configured to select a target cell in a first wireless communications system; and a sending module 802 configured to send, to a second network device in a second wireless communications system, cell identity information of the target cell selected by the processing module 801, where the terminal device accesses a core network in the first wireless communications system by using a first network device to which the target cell belongs, and the terminal device accesses the target cell.

The terminal device may further include a receiving module configured to receive a message and/or data that are/is sent by the first network device or the second network device.

For another embodiment of the terminal device, refer to implementation of the terminal device 201 in Embodiment 3. The processing module 801 may be configured to perform processing and control operations of the terminal device 201. The sending module 802 may be configured to perform a sending operation of the terminal device 201. The receiving module may be configured to perform a receiving operation of the terminal device 201.

For a procedure in which the terminal device interacts with the first network device and the second network device, refer to the procedure in which the terminal device 201 interacts with the first network device 202 and the second network device 203 in the procedure shown in FIG. 4. For content and a structure of a message sent or received by the terminal device, also refer to the description of the procedure.

An embodiment of the terminal device may be shown in FIG. 9. A processor 901 may be configured to implement a function of the processing module 801. A transmitter 902 may be configured to implement a function of the sending module 802. In one embodiment, a receiver may further be included, and may be configured to implement a function of the receiving module in the terminal device. In addition, the terminal device may further include a memory configured to store a program and data. The processor 901 may perform processing and control by invoking the program stored in the memory.

The transmitter 902, the memory, and the receiver each may be directly connected to the processor 901. Alternatively, the transmitter 902, the memory, the receiver, and the processor 901 each are connected to a bus, and the components communicate with each other by using the bus.

Embodiment 7

FIG. 10 is a schematic structural diagram of a third type of terminal device according to one embodiment. As shown in FIG. 10, the terminal device includes:

a processing module 1001 configured to obtain cell information of at least one cell in a first wireless communications system; and a sending module 1002 configured to send, to a second network device in a second wireless communications system, the cell information of the at least one cell obtained by the processing module 1001, where the terminal device accesses a target cell, and accesses a core network in the first wireless communications system by using a first network device to which the target cell in the at least one cell belongs.

The terminal device may further include a receiving module, configured to receive a message and/or data that are/is sent by the first network device or the second network device.

For another embodiment of the terminal device, refer to implementation of the terminal device 201 in Embodiment 4. The processing module 1001 may be configured to perform processing and control operations of the terminal device 201. The sending module 1002 may be configured to perform a sending operation of the terminal device 201. The receiving module may be configured to perform a receiving operation of the terminal device 201.

For a procedure in which the terminal device interacts with the first network device and the second network device, refer to the procedure in which the terminal device 201 interacts with the first network device 202 and the second network device 203 in the procedure shown in FIG. 5. For content and a structure of a message sent or received by the terminal device, also refer to the description of the procedure.

An embodiment of the terminal device may be shown in FIG. 11. A processor 1101 may be configured to implement a function of the processing module 1001. A transmitter 1102 may be configured to implement a function of the sending module 1002. In one embodiment, a receiver may further be included, and may be configured to implement a function of the receiving module in the terminal device. In addition, the terminal device may further include a memory, configured to store a program and data. The processor 1101 may perform processing and control by invoking the program stored in the memory.

The transmitter 1102, the memory, and the receiver each may be directly connected to the processor 1101. Alternatively, the transmitter 1102, the memory, the receiver, and the processor 1101 each are connected to a bus, and the components communicate with each other by using the bus.

Embodiment 8

FIG. 12 is a schematic structural diagram of a first type of first network device according to one embodiment. The first network device is located in a first wireless communications system. As shown in FIG. 12, the first network device includes:

a receiving module 1201 configured to receive a channel establishment request sent by a second network device in a second wireless communications system, where the channel establishment request carries cell identity information of a target cell, to indicate the target cell that is identified by the cell identity information and that is to be accessed by a terminal device, and the target cell belongs to the first network device;

a processing module 1202 configured to determine the target cell to be accessed by the terminal device and configure, for the terminal device, access information used when the terminal device accesses the target cell; and a sending module 1203 configured to send a channel establishment response to the second network device, where the channel establishment response is used to instruct the terminal device to access the target cell, and the channel establishment response carries the access information configured by the processing module 1202.

For another embodiment of the first network device, refer to implementation of the first network device 202 in Embodiment 2 or Embodiment 3. The processing module 1202 may be configured to perform processing and control operations of the first network device 202. The sending module 1203 may be configured to perform an operation of sending information to the second network device 203 by the first network device 202. The receiving module 1201 may be configured to perform an operation of receiving information from the second network device 203 by the first network device 202.

For a procedure in which the first network device interacts with the terminal device and the second network device, refer to the procedure in which the first network device 202 interacts with the terminal device 201 and the second network device 203 in the procedure shown in FIG. 3 or FIG. 4. For content and a structure of a message sent or received by the first network device, also refer to the description of the procedure.

An embodiment of the first network device may be shown in FIG. 13. A processor 1302 may be configured to implement a function of the processing module 1202. A transmitter 1303 may be configured to implement a function of the sending module 1203. A receiver 1301 may be configured to implement a function of the receiving module 1201. In addition, the first network device may further include a memory configured to store a program and data. The processor 1302 may perform processing and control by invoking the program stored in the memory.

If the second network device and the first network device communicate with each other by way of optical fiber transmission, the transmitter 1303 may be an optical transmitter, and the receiver 1301 may be an optical receiver. If the second network device and the first network device communicate with each other by means of microwave transmission, the transmitter 1303 may be a microwave transmitter, and the receiver 1301 may be a microwave receiver.

In addition, the first network device may further include a radio frequency transceiver that communicates with the terminal device.

The transmitter 1303, the memory, and the receiver 1301 each may be directly connected to the processor 1302. Alternatively, the transmitter 1303, the memory, the receiver 1301, and the processor 1302 each are connected to a bus, and the components communicate with each other by using the bus.

Embodiment 9

FIG. 14 is a schematic structural diagram of a second type of first network device according to one embodiment. The first network device is located in a first wireless communications system. As shown in FIG. 14, the first network device includes:

a receiving module 1401 configured to receive a channel establishment request sent by a second network device in a second wireless communications system, where the channel establishment request includes cell information of at least one cell of the first network device; and a processing module 1402 configured to select a target cell from the at least one cell according to the cell information of the at least one cell included in the channel establishment request received by the receiving module 1401.

The first network device may further include a sending module that may be configured to send data and/or a message to the second network device.

For another embodiment of the first network device, refer to implementation of the first network device 202 in Embodiment 4. The processing module 1402 may be configured to perform processing and control operations of the first network device 202. The sending module may be configured to perform an operation of sending information to the second network device 203 by the first network device 202. The receiving module 1401 may be configured to perform an operation of receiving information from the second network device 203 by the first network device 202.

For a procedure in which the first network device interacts with the terminal device and the second network device, refer to the procedure in which the first network device 202 interacts with the terminal device 201 and the second network device 203 in the procedure shown in FIG. 5. For content and a structure of a message sent or received by the first network device, also refer to the description of the procedure.

An embodiment of the first network device may be shown in FIG. 15. A processor 1502 may be configured to implement a function of the processing module 1402. A transmitter may be configured to implement a function of the sending module. A receiver 1501 may be configured to implement a function of the receiving module 1401. In addition, the first network device may further include a memory, configured to store a program and data. The processor 1502 may perform processing and control by invoking the program stored in the memory.

If the second network device and the first network device communicate with each other by means of optical fiber transmission, the transmitter may be an optical transmitter, and the receiver 1501 may be an optical receiver. If the second network device and the first network device communicate with each other by means of microwave transmission, the transmitter may be a microwave transmitter, and the receiver 1501 may be a microwave receiver.

In addition, the first network device may further include a radio frequency transceiver that communicates with the terminal device.

The transmitter, the memory, and the receiver 1501 each may be directly connected to the processor 1502. Alternatively, the transmitter, the memory, the receiver 1501, and the processor 1502 each are connected to a bus, and the components communicate with each other by using the bus.

Embodiment 10

FIG. 16 is a schematic structural diagram of a first type of second network device according to Embodiment 10. The second network device is located in a second wireless communications system. As shown in FIG. 16, the second network device includes:

a receiving module 1601 configured to receive cell information of at least one cell in a first wireless communications system that is sent by a terminal device; and a processing module 1602 configured to select a target cell in the first wireless communications system according to the cell information of the at least one cell received by the receiving module 1601, where the terminal device accesses the target cell, and accesses a core network in the first wireless communications system by using a first network device to which the target cell belongs.

The second network device may further include a sending module that may be configured to send data and/or a message to the terminal device.

For another optional implementation of the second network device, refer to implementation of the second network device 203 in Embodiment 2. The processing module 1602 may be configured to perform processing and control operations of the second network device 203. The sending module may be configured to perform an operation of sending information to the terminal device 201 by the second network device 203. The receiving module 1601 may be configured to perform an operation of receiving information from the terminal device 201 by the second network device 203.

For a procedure in which the second network device interacts with the terminal device and the first network device, refer to the procedure in which the second network device 203 interacts with the first network device 202 and the terminal device 201 in the procedure shown in FIG. 3. For content and a structure of a message sent or received by the second network device, also refer to the description of the procedure.

An embodiment of the second network device may be shown in FIG. 17. A processor 1702 may be configured to implement a function of the processing module 1602. A transmitter may be configured to implement a function of the sending module, and may be a radio frequency transmitter. A receiver 1701 may be configured to implement a function of the receiving module 1601, and may be a radio frequency receiver. In addition, the second network device may further include a memory, configured to store a program and data. The processor 1702 may perform processing and control by invoking the program stored in the memory.

In addition, the second network device may further include another transceiver. The other transceiver is configured to perform transmission between the second network device and the first network device, and may be an optical transceiver, a microwave transceiver, or the like.

The transmitter, the memory, and the receiver 1701 each may be directly connected to the processor 1702. Alternatively, the transmitter, the memory, the receiver 1701, and the processor 1702 each are connected to a bus, and the components communicate with each other by using the bus.

Embodiment 11

FIG. 18 is a schematic structural diagram of a second type of second network device according to one embodiment. The second network device is located in a second wireless communications system. As shown in FIG. 18, the second network device includes:

a receiving module 1801 configured to receive cell identity information of a target cell sent by a terminal device, where the target cell is a cell, in a first wireless communications system, that is selected by the terminal device, where the terminal device accesses a core network in the first wireless communications system by using a first network device to which the target cell belongs, and the terminal device accesses the target cell; and a processing module 1802 configured to determine the target cell according to cell identity information of the target cell received by the receiving module 1801.

The second network device may further include a sending module that may be configured to send data and/or a message to the terminal device.

For another optional implementation of the second network device, refer to implementation of the second network device 203 in Embodiment 3. The processing module 1802 may be configured to perform processing and control operations of the second network device 203. The sending module may be configured to perform an operation of sending information to the terminal device 201 by the second network device 203. The receiving module 1801 may be configured to perform an operation of receiving information from the terminal device 201 by the second network device 203.

For a procedure in which the second network device interacts with the terminal device and the first network device, refer to the procedure in which the second network device 203 interacts with the first network device 202 and the terminal device 201 in the procedure shown in FIG. 4. For content and a structure of a message sent or received by the second network device, also refer to the description of the procedure.

An embodiment of the second network device may be shown in FIG. 19. A processor 1902 may be configured to implement a function of the processing module 1802. A transmitter may be configured to implement a function of the sending module, and may be a radio frequency transmitter. A receiver 1901 may be configured to implement a function of the receiving module 1801, and may be a radio frequency receiver. In addition, the second network device may further include a memory, configured to store a program and data. The processor 1902 may perform processing and control by invoking the program stored in the memory.

In addition, the second network device may further include another transceiver that communicates with the first network device, for example, an optical transceiver or a microwave transceiver.

The transmitter, the memory, and the receiver 1901 each may be directly connected to the processor 1902. Alternatively, the transmitter, the memory, the receiver 1901, and the processor 1902 each are connected to a bus, and the components communicate with each other by using the bus.

Embodiment 12

FIG. 20 is a schematic structural diagram of a third type of second network device according to one embodiment.

The second network device is located in a second wireless communications system. As shown in FIG. 20, the second network device includes:

a receiving module 2001 configured to receive cell information of at least one cell in a first wireless communications system that is sent by a terminal device; and a sending module 2002 configured to send a channel establishment request to a first network device to which each of the at least one cell in the first wireless communications system belongs, where a channel establishment request sent to one first network device includes cell information of a cell served by the first network device, in the at least one cell, and the cell information is indicated to the first network device; and a target cell that is allowed to be accessed by the terminal device is selected, according to the received cell information, from the cell corresponding to the received cell information, where the terminal device accesses a core network in the first wireless communications system by using the first network device to which the target cell belongs, and the terminal device accesses the target cell.

The second network device may further include a processing module that may be configured to complete processing and control functions.

For another embodiment of the second network device, refer to implementation of the second network device 203 in Embodiment 4. The processing module may be configured to perform processing and control operations of the second network device 203. The sending module 2002 may be configured to perform an operation of sending information to the first network device 202 by the second network device 203. The receiving module 2001 may be configured to perform an operation of receiving information from the terminal device 201 by the second network device 203.

For a procedure in which the second network device interacts with the terminal device and the first network device, refer to the procedure in which the second network device 203 interacts with the first network device 202 and the terminal device 201 in the procedure shown in FIG. 5. For content and a structure of a message sent or received by the second network device, also refer to the description of the procedure.

An embodiment of the second network device may be shown in FIG. 21. A processor may be configured to implement a function of the processing module. A transmitter 2102 may be configured to implement a function of the sending module 2002, and may be an optical transmitter or a microwave transmitter. A receiver 2101 may be configured to implement a function of the receiving module 2001, and may be a radio frequency receiver. In addition, the second network device may further include a memory, configured to store a program and data. The processor may perform processing and control by invoking the program stored in the memory.

The transmitter 2102, the memory, and the receiver 2101 each may be directly connected to the processor. Alternatively, the transmitter 2102, the memory, the receiver 2101, and the processor each are connected to a bus, and the components communicate with each other by using the bus.

In conclusion, in this disclosure, regardless of selecting a target cell by the terminal device, the second network device, or the first network device, the to-be-accessed target cell can be selected for the terminal device by means of message interaction between the terminal device, the first network device, and the second network device.

It can be understood that, in the embodiments of the present disclosure, a manner of communication between the first network device and the second network device are not particularly limited. For example, the first network device and the second network device may communicate with each other by means of a microwave or an optical fiber. When the first network device and the second network device communicate with each other by means of a microwave, both the first network device and the second network device are internally provided with a microwave receiver and a microwave transmitter, or a microwave transceiver. When the first network device and the second network device communicate with each other by means of an optical fiber, both the first network device and the second network device are internally provided with an optical receiver and an optical transmitter, or an optical transceiver.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as covering the preferred embodiments and all changes and modifications falling within the scope of the present disclosure.

Obviously, persons skilled in the art can make various modifications and variations to the embodiments of the present disclosure without departing from a scope of the embodiments of the present disclosure. The present disclosure is intended to cover these modifications and variations provided that they fall within the protection scope defined by the following claims and their equivalent technologies.

What is claimed is:

1. A terminal device, comprising:
   a processor configured to obtain cell information of at least one cell in a first wireless communications system;
   a transmitter configured to send, to a second network device in a second wireless communications system, the obtained cell information of tea least one cell, wherein the cell information of the at least one cell is used to instruct the second network device to select a target cell in the first wireless communications system according to the obtained cell information of the at least one cell; and
   a receiver configured to: after the transmitter sends the cell information of the at least one cell to the second network device in the second wireless communications system, receive the following information from the second network device:
      access information that is set by a first network device for the terminal device and that is used when the terminal device accesses the target cell, and
      cell identity information of the target cell selected by the second network device for the terminal device;
   wherein the processor is further configured to control, according to the access information and the cell identity information of the target cell, the terminal device to access the target cell, wherein the terminal device accesses the target cell, and accesses a core network in the first wireless communications system by using the first network device associated with the target cell,
   wherein the access information is included in a header of layer 1 or layer 2 data packet sent by the second network device, or the access information comprises in an air interface establishment message that is send by the first network device to the terminal device and that is forwarded by the second network device,
   wherein the air interface establishment message is used to establish an air interface connection between the terminal device and the target cell.

2. The terminal device according to claim 1, wherein the cell information comprises cell identity information.

3. The terminal device according to claim 2, wherein the cell information further comprises one or more types of the following cell signal quality information:
   cell-received signal strength information, or
   cell-received signal quality information.

4. The terminal device according to claim 2, wherein the processor is further configured to sort the obtained cell identity information of the at least one cell according to received signal strength or received signal quality of a corresponding cell; and
   the transmitter is further configured to send, to the second network device, the sorted cell identity information of the at least one cell.

5. A network device located in a second wireless communications system, the network device comprising:
   a receiver configured to receive cell information of at least one cell in a first wireless communications system that is from a terminal device;
   a processor configured to select a target cell in the first wireless communications system according to the received cell information of the at least one cell; and
   a transmitter configured to: after the processor selects the target cell in the first wireless communication system according to the received cell information of the at least one cell, send a channel establishment request to a first network device, wherein the channel establishment request carries cell identity information of the target cell to identify the target cell, wherein the target cell is accessed by the terminal device, wherein
   the terminal device accesses the target cell, and accesses a core network in the first wireless communications system by using the first network device associated with the target cell,
   wherein the receiver is further configure to:
      after the transmitter sends the channel establishment request to the first network device, receive a channel establishment response from the first network device, wherein the channel establishment response is used to instruct the terminal device to access the target cell, and the channel establishment response carries access information that is configured by the first network device for the terminal device, and used when the terminal device accesses the target cell; and
      the transmitter is further configured to send the following information to the terminal device, to instruct the terminal device to access the target cell according to the access information and the cell identity information of the target cell;
      the access information, and
      the cell identity information of the target cell selected by the processor,
   wherein the access information is included in a header of layer 1 or layer 2 data packet sent by the network device; or the access information comprises in an air interface establishment message that is sent by the first network device to the terminal device and that is forwarded by the network device, wherein the air interface establishment message is used to establish an air interface connection between the terminal device and the target cell.

6. The network device according to claim 5, wherein the cell information comprises cell identity information.

7. The network device according to claim 6, wherein the processor is further configured to sort the cell information of the at least one cell according to received signal strength or received signal quality of a corresponding cell.

8. The network device according to claim 5, wherein the cell information comprises cell identity information and one or more types of the following cell signal quality information:
   cell-received signal strength information, or
   cell-received signal quality information.

* * * * *

UNITED STATES PATENT AND TRADEMARK OFFICE
CERTIFICATE OF CORRECTION

PATENT NO. : 10,667,209 B2
APPLICATION NO. : 16/020921
DATED : May 26, 2020
INVENTOR(S) : Haiyan Luo, Hongzhuo Zhang and Tianle Deng Page 1 of 1

It is certified that error appears in the above-identified patent and that said Letters Patent is hereby corrected as shown below:

In the Claims

In Claim 1, Column 35, Line 15, replace "tea" with --at--.

In Claim 1, Column 35, Line 39, replace "layer 1" with --a layer 1--.

In Claim 1, Column 35, Line 41, replace "send" with --sent--.

In Claim 5, Column 36, Line 10, replace "communication" with --communications--.

In Claim 5, Column 36, Line 21, replace "configure" with --configured--.

In Claim 5, Column 36, Line 40, replace "layer 1" with --a layer 1--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*